Dec. 17, 1957  C. S. HORNBERGER ET AL  2,816,437
MOISTURE METER

Original Filed Sept. 30, 1949  6 Sheets-Sheet 1

Inventors
Carl S. Hornberger &
William R. Lewis
By:- Mann and Brown
Atty's.

Dec. 17, 1957  C. S. HORNBERGER ET AL  2,816,437
MOISTURE METER
Original Filed Sept. 30, 1949  6 Sheets-Sheet 2
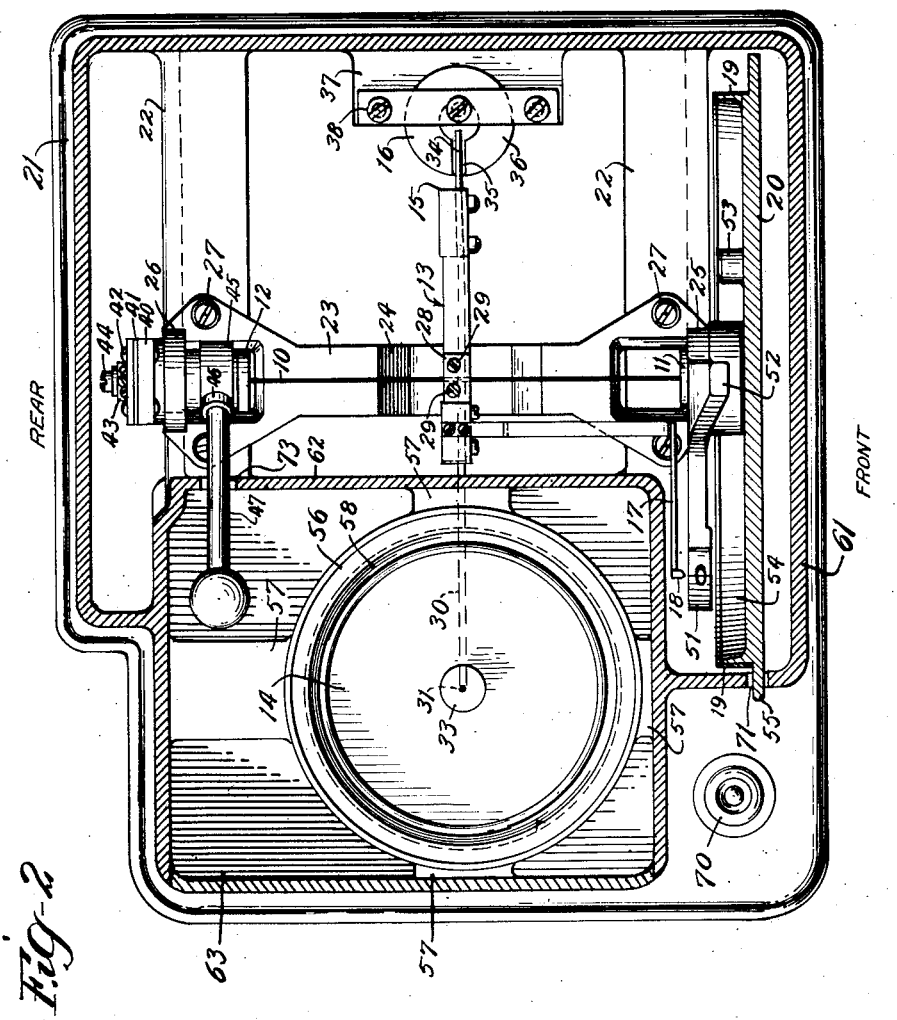

Dec. 17, 1957     C. S. HORNBERGER ET AL     2,816,437
MOISTURE METER
Original Filed Sept. 30, 1949     6 Sheets-Sheet 3
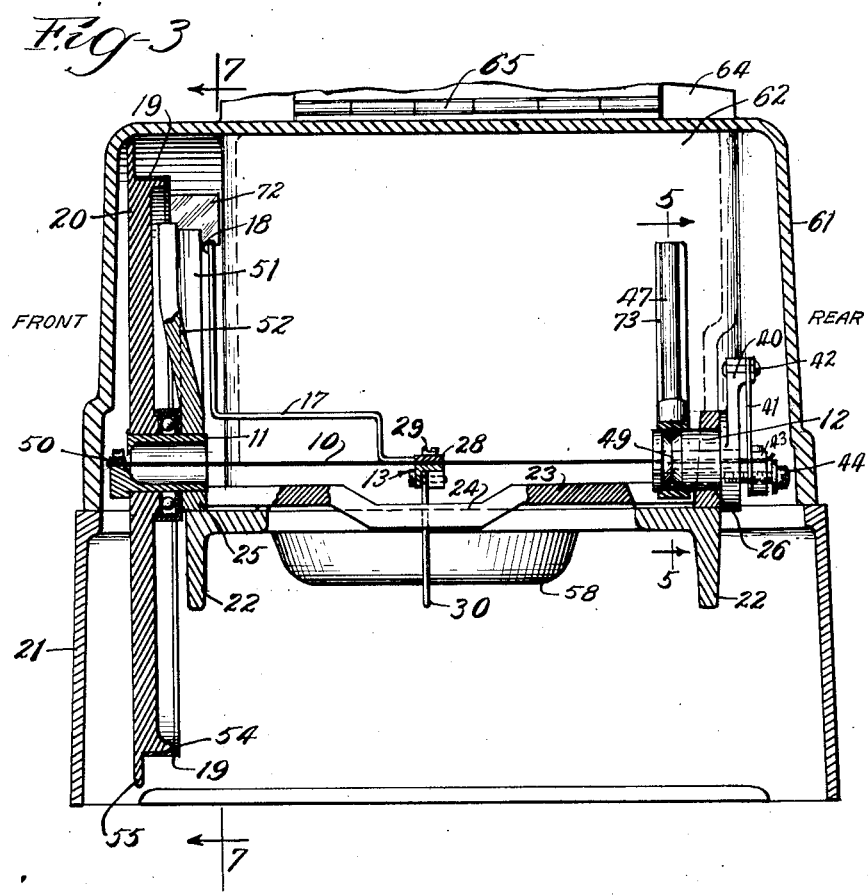
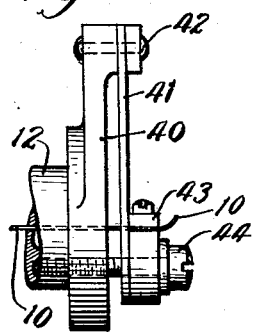
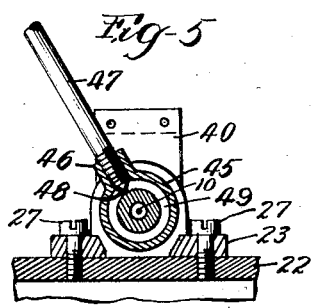
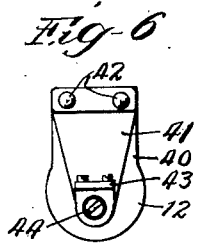

Dec. 17, 1957 C. S. HORNBERGER ET AL 2,816,437
MOISTURE METER
Original Filed Sept. 30, 1949 6 Sheets-Sheet 4
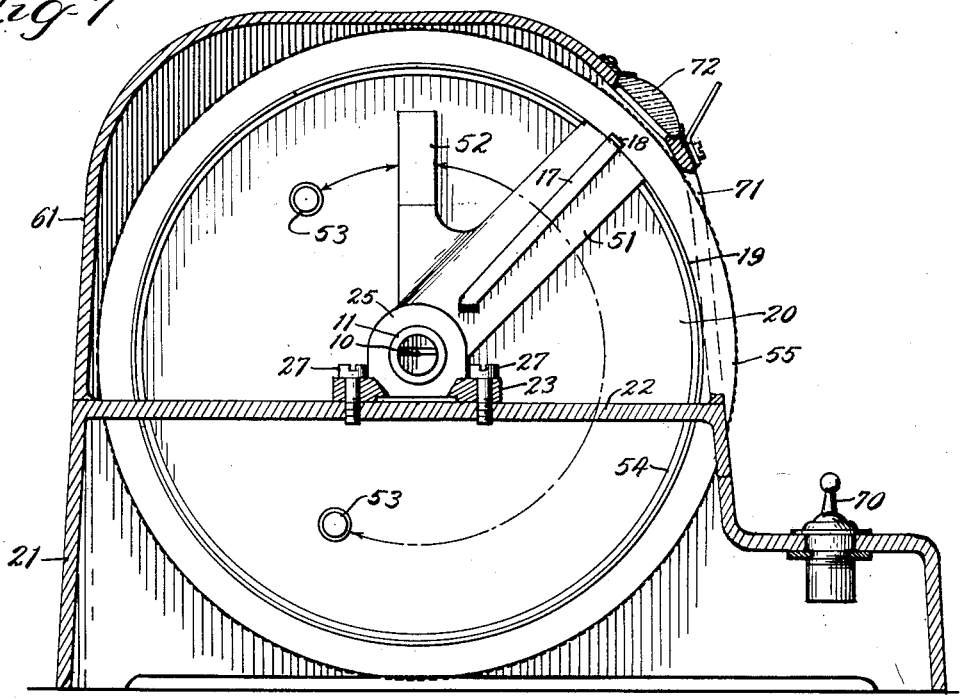
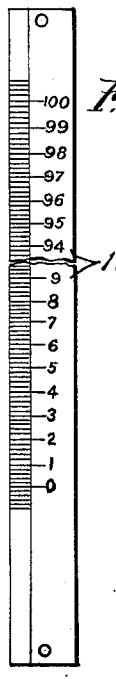
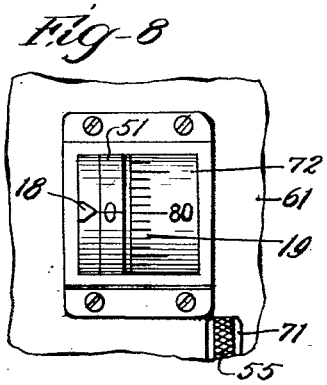
Inventors,
Carl S. Hornberger &
William R. Lewis
By Mann and Brown
Attys.

Dec. 17, 1957   C. S. HORNBERGER ET AL   2,816,437
MOISTURE METER
Original Filed Sept. 30, 1949   6 Sheets-Sheet 5
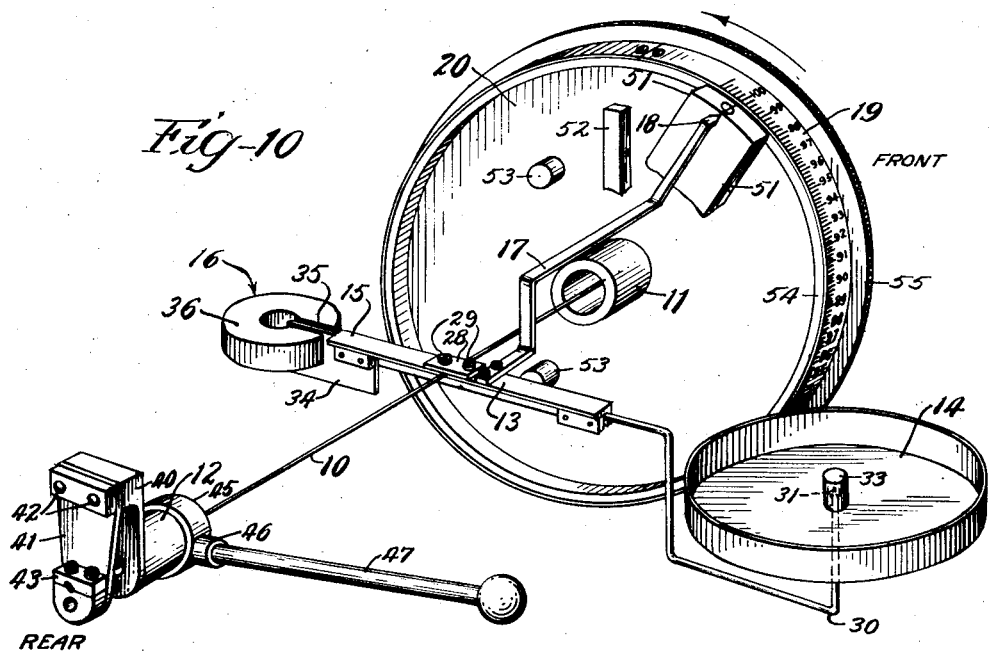
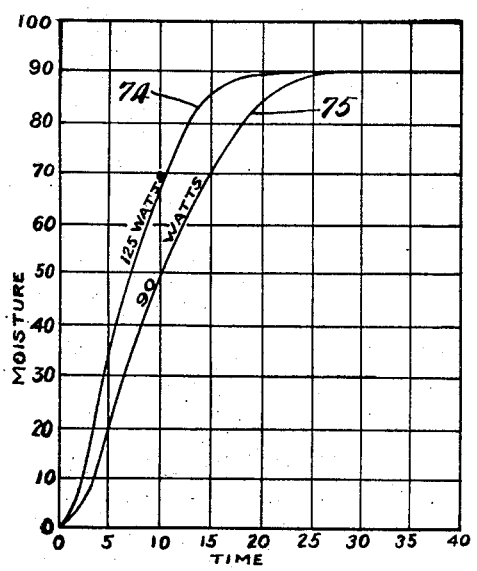

Dec. 17, 1957  C. S. HORNBERGER ET AL  2,816,437
MOISTURE METER
Original Filed Sept. 30, 1949  6 Sheets-Sheet 6
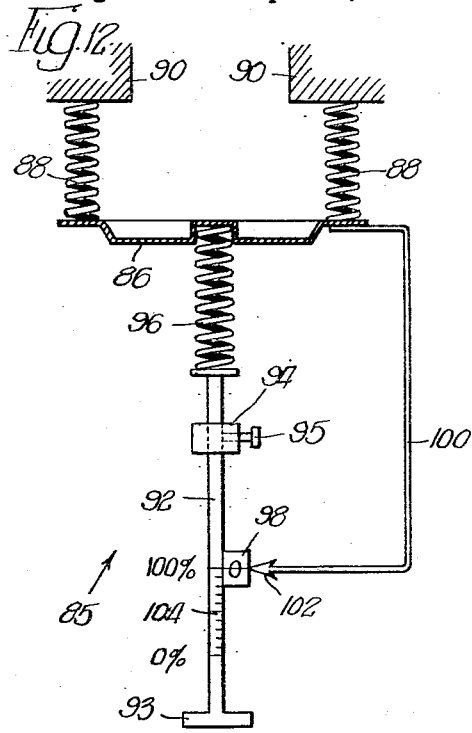
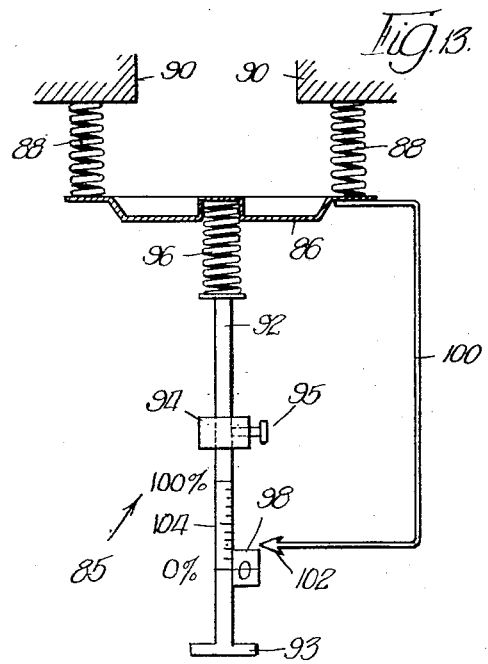
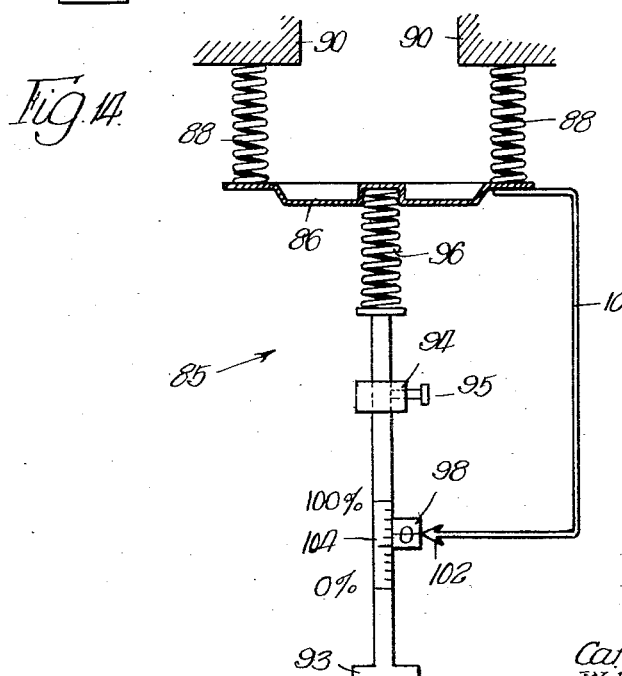
INVENTORS.
Carl S. Hornberger,
BY William R. Lewis,
Mann, Brown & Hansman
ATTYS.

United States Patent Office 2,816,437
Patented Dec. 17, 1957

2,816,437
MOISTURE METER

Carl S. Hornberger, Glen Ellyn, Ill., and William R. Lewis, North Kansas City, Mo., assignors to Central Scientific Company, Chicago, Ill., a corporation of Illinois Continuation of abandoned application Serial No. 118,824, September 30, 1949. This application June 8, 1955, Serial No. 513,998

17 Claims. (Cl. 73—76)

Standard tests in common use for determining the percentage of moisture in various substances involve heating a weighed specimen, usually relatively large, in an oven at a temperature that will not vaporize elements other than moisture, and for a corresponding period ranging from one hour to twenty-four. This operation is followed by weighing to determine the loss by evaporation and calculations to arrive at the percentage of moisture.

All of the tests and apparatus used in them have long been objectionable on account of the time involved and the skill required, but they still remain in use.

The principal object of this invention is to provide a simple means for quickly ascertaining the percentage of moisture in a selected specimen of material.

Generally speaking, this is accomplished by putting the specimen in a scale pan subject to evaporating heat and borne by a lever fixed to a torsion wire equipped with a pointer moving with the pan and a movable scale connected with one end of the wire to change the torsion as it is moved. Thus, a specimen is first placed in a pan and in effect weighed; then heat is applied; and the loss of weight by evaporation is measured directly in percentage of the whole.

Further objects and advantages of the invention will appear as the disclosure proceeds and the description is read in connection with the accompanying drawings, and in which:

Fig. 2 is a horizontal section of the same taken on the line 2—2 of Fig. 1, with parts shown in elevation;

Fig. 3 is a vertical section taken on the line 3—3 of Fig. 1;

Fig. 4 is an enlarged detail of the connection for the wire at what will be called its rear end;

Fig. 5 is a vertical section taken on the line 5—5 of Fig. 3 through the means for adjusting the torsion on the wire at the rear end;

Fig. 6 is an elevation looking at Fig. 4 from the right;

Fig. 7 is a vertical section on the line 7—7 of Fig. 3;

Fig. 8 is a detail of a window and the adjacent portions of the scale, pointer, and datum line;

Fig. 9 is a plan view of the scale, intermediate portions being broken away;

Fig. 10 is a diagram of the operating parts of the apparatus removed from the housing and supports to reduce it to simple essentials;

Fig. 11 is a chart made by plotting the successive readings of the percentage of moisture driven off from a specimen during selected intervals; and Figs. 12–14 are diagrammatic views illustrating how our herein described method may be performed on another type of apparatus.

General description

Figure 1:
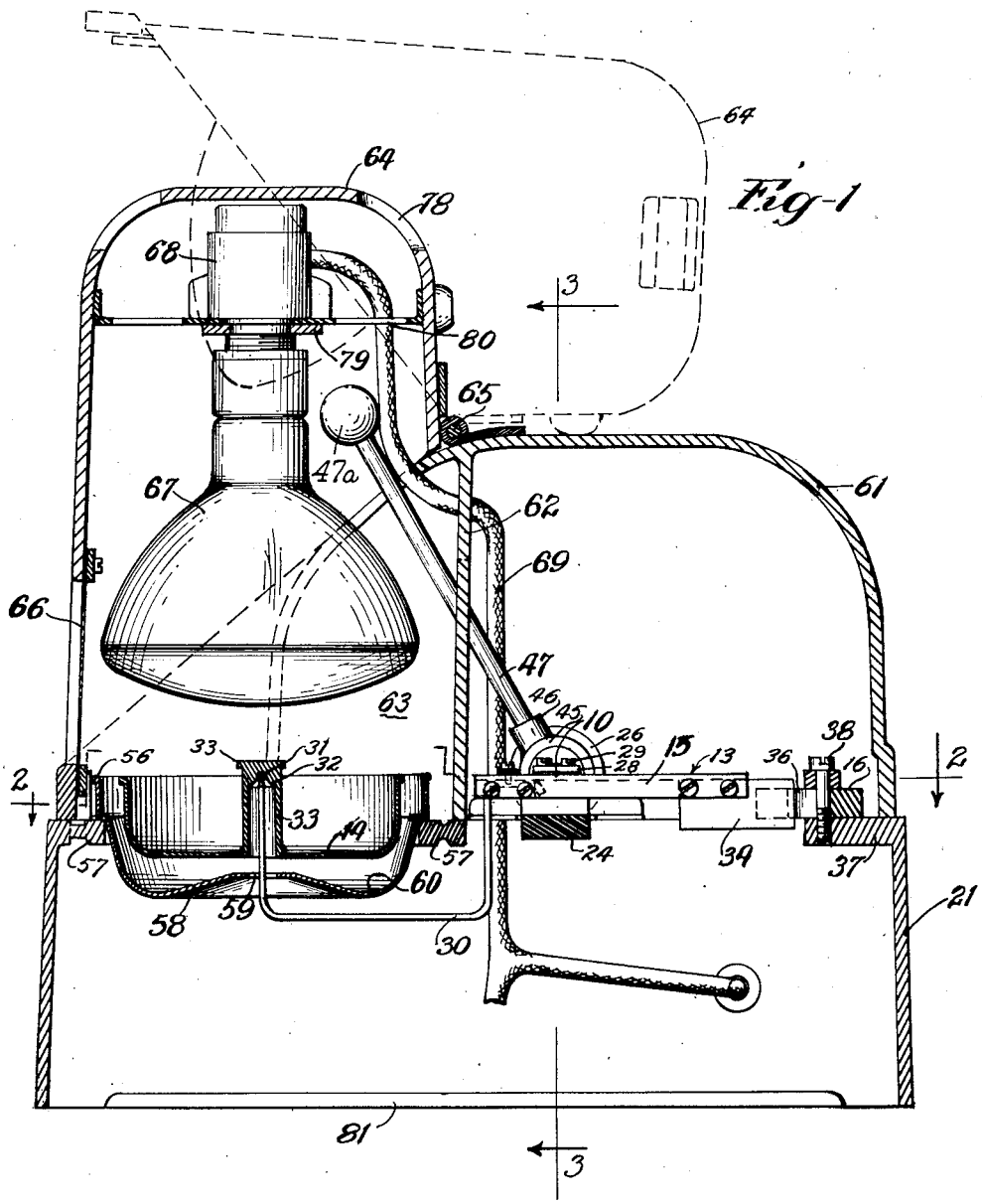
Fig. 1 is a vertical section through a preferred embodiment of the apparatus and a suitable housing and support.

In Fig. 10, the torsion wire, generally indicated by 10, is shown stretched between a front hub 11 and a rear hub 12 with a lever 13 clamped to its mid portion and bearing a scale pan 14 at one end and a counter-balance 15 at the other associated with a magnetic dampener, generally indicated by 16.

The lever 13 is provided with a pointer 17 having a portion 18 adapted to come opposite a stationary datum line zero associated with a scale 19 on a wheel 20 mounted on, and fixed to, the front hub 11.

In order to get the illustrated instrument in condition to make a test, the wheel 20 is rotated to set the scale 19 with one hundred (representing 100%) opposite the datum line zero. The rear hub 12, fastened to the wire 10 and held in adjusted position by friction, is then rotated until the end portion 18 of the pointer 17 comes opposite the datum line zero, as shown in Fig. 10. In this condition, there is no twist in the front portion of the wire and just enough twist in the back portion of the wire to compensate for lack of balance between the pan 14 and the counter-balance 15. There preferably should be zero torsion in the front portion of the wire.

In order to make a moisture determination, the wheel 20 is rotated in the direction of the arrow of Fig. 10 to bring the scale 19 to zero (that is, 0%) at the datum line. As the hub 11 of the wheel 20 is connected with the front end of the torsion wire 10, this movement of the wheel puts the front portion of the wire 10 in torsion and throws the pointer away from the datum line in a counterclockwise direction, that is, in the direction of the arrow in Fig. 10.

With the apparatus in this condition, enough of the specimen to be tested is put in the pan 14 to bring the pointer 18 back to zero, that is, the datum line, which operation in effect weighs the specimen, the percentage of moisture of which is to be determined. It also indexes the machine.

Evaporating heat is then applied to the specimen in the pan 14 to drive off moisture. As it leaves, the weight of the specimen decreases, and the torsion in the wire raises the pan 14, resulting in counterclockwise rotation of the pointer away from the datum line zero.

By rotating the wheel 20 clockwise until the pointer 18 comes back to the datum line, thereby reducing the torsion applied to the wire sufficiently to compensate for the loss of weight of the specimen (due to evaporation of moisture), the scale 19 is brought into position for reading the loss in weight due to evaporation directly in percentage of the specimen. By graduating the scale in units of 100 and sub-units of 5ths or 10ths, the percentage of moisture that has been driven off from the specimen is read directly on the scale. This can be done after all moisture has been driven off, at which time the pointer 18 will have become stationary, or it can be done during the evaporation process to indicate the percentage of moisture that has been driven off at any particular stage of the process.

Specific description

In the preferred embodiment shown in Figs. 1–9, the apparatus is mounted upon a somewhat rectangular base 21 open at the bottom and spanned at the top by beams 22 (see Figs. 2 and 3) of angle section, upon which a torsion frame 23, arched at 24, is made fast by screws 27. Said beams 22 carry a journal bearing 25 for the front hub 11 and a journal bearing 26 for the rear hub 12.

The lever 13 is fixed to the torsion wire 10 by a clamp 28 and screws 29. It includes the U-shaped arm 30 (Fig. 1) presenting a needle bearing 31 to a cone bearing 32 at the upper end of a tube 33, which tube extends upwardly from the middle of the pan 14 so that the point of support for the pan is above the center of gravity of the pan with its specimen load.

The counter-balance 15 forming another arm of the lever is provided with a copper plate 34 (preferably nickel-plated; aluminum or silver would serve as well) adapted to move through the narrow gap 35 (Fig. 10) in a horseshoe magnet 36 fixed to a ledge 37 (Fig. 1) on the base 21 by a screw clamp 38.

Eddy currents induced in the plate 34 constitute a field opposite to the field of the magnet 16 and oppose any movement of the plate 34, thereby quickly dampening vibrations of the pan 14 and the lever 13.

The rear hub 12 is provided with an arm 40 (Fig. 4) to which one end of a Phosphor bronze spring 41 is secured by rivets 42. The opposite end of the spring is provided with a screw clamp 43 for fastening the rear end of the torsion wire 10. It is also provided with a screw 44 threaded into the hub 12, which is rotated in one direction to bias the spring 41, as indicated in Fig. 4, to slacken the tension on the torsion wire 10 and permit adjustment or replacement.

The hub 12 is also provided with a rotatable collar 45 having a hollow threaded arm 46 (Fig. 5) adapted to screw threadedly receive a pointed rod 47, the conical end 48 of which is adapted to seat in a groove 49 in the hub when it is desired to rotate the hub to adjust the torsion in the wire 10. The rod 47 carries a hand grip element 47a on the outwardly extending end thereof and these two elements comprise a handle for rotating hub 12.

The hub 11 is provided with a screw clamp 50 for making the front end of the torsion wire 10 fast.

The frame 23 adjacent to the journal bearing 25 has an inclined arm 51 (see Figs. 2 and 7) bearing the datum line zero at its end. It also has an upright arm 52 lying in the path of pins 53 on the disc 20 to limit the rotation of the disc in opposite directions.

The disc 20 is provided with a cylindrical rim 54 on which the scale 19 is mounted, and adjacent thereto is a flange 55 knurled on the edge and adapted to be urged by the thumb or finger to rotate the disc.

The base 21 is provided with a ring-shaped member 56 (Figs. 1 and 2) supported by four arms 57 and equipped with a pressed metal bowl 58 forming a sort of housing for the pan 14 and closed on the bottom except for a central opening 59 to admit the U-shaped arm 30 of the lever 13 and provide suitable air relief to permit appropriate movement of the scale pan 14.

The bowl has an annular depression 60 and sufficient clearance at the sides to permit the scale pan to tip freely without coming into contact with the bowl.

Most of the apparatus is enclosed within a housing 61 resting on the base 21 and secured to it.

A partition wall 62 of the housing extends across in front of the torsion wire 10 and serves to cut off a sort of chamber 63 at the front, in which the pan 14 is exposed at the bottom; and above it there is an opening to afford access to the pan.

That opening is closed at will by a heater casing 64 hinged to the cover 61 at 65, and provided with a window 66 to permit observation of the specimen in the pan under test.

As here illustrated, the heater is represented by an electric lamp bulb 67 in a socket 68 and connected by wiring with a control switch 70 (see Figs. 2 and 7).

A portion of the cover 61 at the front is slotted at 71 to permit the flange 55 to protrude for ready access when it is desired to rotate the disc 20.

Adjacent to and above the slit 71 is the observation window 72 (Figs. 7 and 8) revealing the datum line zero and the adjacent portions of the scale 19 and the pointer end 18.

The partition 62 is slotted at 73 (Fig. 2) to permit the rod 47 to be inserted into the collar 45 and rotated to adjust the hub 12.

The operation of the apparatus and the preferred procedure will be clear from the description in connection with Fig. 10. While in the illustrated apparatus the wire 10 is adjusted to remove all torsion therefrom before the predetermined amount of torsion is applied, said predetermined torsion being measured by the space between the 100 and the zero graduations of scale 19, it will be appreciated that this predetermined torsion may be applied to a wire under torsion, so long as the torsion initially in the wire plus the predetermined torsion do not exceed the elastic limit of the wire.

In the chart, Fig. 11, the ordinates are units of moisture and the abscissas are units of time. The curve 74 is plotted by readings on a specimen of material when heat was applied by a 125-watt lamp 67, whereas the curve 75 was plotted by similar readings when a 90-watt lamp 67 was used.

The heater casing 64 is provided with vents 78, and the plate 79 for supporting the lamp socket 68 is provided with vents 80. The base 21 is cut away at the side, as indicated at 81.

With this arrangement, air is freely admitted to the bottom of the base, and is freely permitted to flow up between the arms 57 about the pan ring 56, over the lamp 67, and out through the vents 80 and 78, thus providing free and adequate ventilation, without permitting convection currents to disturb the torsion balance.

In the embodiment of Figs. 1–10, especially designed to determine the percentage of moisture in hay, leaves, flour, bread, etc., the torsion wire 10 is standard music wire .016″ in diameter, which has a torsion modulus of approximately $8.1$ by $10^{11}$. The length of the wire between the lever and the clamp 50, or the front portion of the wire, is 4¾″. The length of the lever arm supporting the pan is also 4¾″, but that coincidence is merely incidental.

The scale pan 14 is made of .010″ aluminum, 4¾″ in diameter by ½″ in depth, and the fulcrum at 31, 32 is approximately ¾″ above the bottom of the pan.

These dimensions and other specific statements, as well as the drawings, are used for the purpose of full and accurate disclosure of an illustrative and preferred embodiment.

Figs. 12–14 have been provided merely to illustrate that our method may be practiced by apparatus other than a torsion balance. Reference numeral 85 in these figures generally indicates a diagrammatically illustrated apparatus or instrument including a horizontally disposed specimen pan 86, a plurality of compression springs 88 interposed between the pan 86 and stationary abutments 90, an elongate vertical rod 92 including a handle 93 slidably mounted in clamping block 94, a set screw 95 screw threaded in said block 94 for releasably fixing said rod 92 in desired position, a compression spring 96 interposed between the end of rod 92 and the pan 86, a stationary datum 98 having a datum line zero formed thereon where indicated, and a pointer 100 fixed to the pan 86 having the end 102 thereof positioned adjacent the datum 98. Preferably the rod 92 is provided with a scale 104 graduated in units of 100 and subunits of 5ths and 10ths, the scale being calibrated in the same manner that the scale 19 is calibrated. In the illustrated apparatus, only the zero graduation (representing 0% moisture) and the 100 graduation (representing 100% moisture) are numbered.

In practicing the method of our invention on the apparatus diagrammatically illustrated in Figs. 12–14, the operator first adjusts the instrument so that the 100 graduation and the pointer end 102 are aligned with the datum zero as shown in Fig. 12. Thereupon, the rod 92 is pushed upwardly until the zero graduation is aligned with the datum line (see Fig. 13), the pan 86 being resiliently urged upwardly against the springs 88 and the pointer end 102 moving upwardly and away from the datum line zero, it being understood that the rod 92 is held in the latter position by the set screw 95.

With the apparatus in the position of Fig. 13, enough of the specimen to be tested is put in the pan 86 to bring the pointer end 102 back to zero, or in alignment with the datum line zero, which operation in effect weighs the specimen and also indexes the machine, as described with respect to the torsion balance.

The evaporating heat is then applied to the specimen in the pan 86 by any suitable means to drive off moisture. As the moisture leaves, the weight of the specimen decreases, and the spring 96 acts to raise the specimen pan 86, thereby moving the pointer end 102 away from and above the datum 98. By releasing set screw 95 and backing off the rod 92, the pointer end 102 may again be restored to alignment with the datum line zero as shown in Fig. 14. This brings the scale 104 into position for reading the loss in weight due to evaporation directly in percentage of the specimen. As in the case of the torsion balance, this can be done after all the moisture has been driven off, at which time the pointer will have become stationary at a position above the datum line zero, or it can be done during the evaporation process to indicate the percentage of moisture that has been driven off at any particular stage of the process.

Comparing the two types of apparatus illustrated on which applicants' method may be performed, it will be seen that in each case a working surface (specimen pans 14 and 86) is provided which is biased to oppose vertical movement. In practicing applicants' method on either form of apparatus, one applies a predetermined resilient force against the apparatus specimen pan opposing gravity, such force having a quantum defined by the spaced apart maximum and minimum scale graduations. In the torsion balance, it is the torsion wire 10 which opposes vertical movement of the specimen pan, and which, upon being twisted a predetermined amount, applies a predetermined resilient force to the pan 14 through the lever 13, while in the apparatus 85, springs 88 and 96 oppose vertical movement, rod 92 being moved upwardly a predetermined amount, as defined by the zero and 100 graduations thereon, to apply a predetermined resilient compressive force against pan 86 in opposition to gravity. The specimen pan of the apparatus will move from its original position to an elevated position, and the operator returns the pan to original position by placing a sufficient amount of specimen on the pan to nullify the effect of the force opposing gravity that is applied. Upon removal of moisture the predetermined force opposing gravity then becomes effective to move the pan upwardly an amount proportional to the weight of the moisture removed. By backing off or reducing this predetermined force an amount proportional to the weight of the moisture removed, the pan will return to its original position. The scales 19 and 104 of the illustrated instruments are graduated for direct reading of percentage of moisture removed, said scales being calibrated in terms of the amount that the predetermined force opposing gravity is reduced to restore the pan to original position.

This application is a continuation of our earlier application, Serial No. 118,824, filed September 30, 1949, now abandoned.

We claim:

1. In a machine for determining the percentage of moisture in substances, a casing having a treatment chamber ventilated through upper and lower openings, sample weighing means including a pan movable in the chamber with means to support the pan from below, means to shield the pan from convection currents including a dished bowl beneath the pan and surrounding the sides thereof, and means to heat the sample in the pan including a radiant heater mounted to move from a position above and adjacent to the pan to an out-of-the-way position.

2. A device of the type described comprising a rotatably mounted scale wheel, a rotatably mounted hub, a torsion wire stretched between and anchored to said scale wheel and said hub, a lever carried by said wire, said lever including a pointer, a stationary datum positioned adjacent the path of movement of said pointer, means for twisting one end of the wire, including a collar rotatably mounted on said hub and having an adjustment handle projecting radially therefrom, said handle including means for releasably engaging said hub to rotate same and hence one end of the wire to align said pointer with said datum.

3. The device set forth in claim 2 wherein the end of said wire secured to said hub passes therethrough, and a resilient spring and screw-threaded adjustment means is interposed between the terminus of said end of said wire and said hub.

4. The device set forth in claim 2, a housing for said device, portions of said housing being formed with slots through which said handle and a portion of said scale wheel, respectively, protrude.

5. The device set forth in claim 2 in which said collar is formed with a hollow internally screw-threaded arm, and said handle is screw-threadedly received in said arm to releasably engage said hub to rotate same for adjusting the torsion in said wire and to align said pointer with said datum.

6. In a machine for determining the percentage of moisture in substances, a casing having a ventilated treatment chamber and a second chamber, heating means in the treatment chamber, sample weighing means including a pan movable in the treatment chamber, and a torsion balance mounted in the second chamber, said balance including a wire tensioned between spaced hubs, one of which is rotatable and has a scale wheel secured thereto and provided with circumferential graduations, means for rotating the scale wheel from the exterior of the casing, a lever fixed to an intermediate portion of the wire and supporting said pan, a pointer fixed to the lever and juxtaposed to said circumferential graduations of the scale wheel, and a datum also juxtaposed to said graduations and said pointer, said graduations, pointer, and datum being exposed to the exterior of the casing for visual observation.

7. A device for determining moisture content comprising a housing, an upright partition wall extending across the housing forming a pair of side by side chambers, a lever mounted in one of said chambers, said lever having one end thereof formed to pass under said partition without interference therewith, said end of said lever supporting from beneath a specimen pan positioned in the other chamber, said other chamber being ventilated through upper and lower openings, means to heat material contained in said specimen pan, and means positioned below said pan to shield it from convection currents.

8. A device for determining moisture percentage comprising a housing, a partition wall extending across the housing forming a pair of chambers, a frame secured to and extending longitudinally of one of said chambers, a scale wheel rotatably mounted on one end of said frame, a hub rotatably mounted on the other end of said frame, said scale wheel being formed with a scale at the periphery thereof representing zero percent and one hundred percent and intermediate graduations representing intermediate percentages of moisture content, a torsion wire stretched between said scale wheel and said hub, a lever secured to an intermediate portion of said wire, a pointer carried by said lever, with the end of said pointer being positioned adjacent said periphery of said scale wheel, a stationary datum interposed between said end of said pointer and said periphery of said scale wheel, the arrangement being such that when said pointer and the one hundred percent graduation of said scale wheel are aligned with said datum, minimum torsion is applied to the portion of the wire extending between said scale wheel and said lever, said frame being positioned above the lower end of said partition, an arm carried by said lever and extending underneath said lower end of said partition and into the other chamber, a scale pan carried by said arm within said other chamber, a movable closure hinged to said housing adjacent said partition and in its open position providing access to said other chamber, heating means carried by said closure, said heating means being positioned above said scale pan, said other chamber being ventilated through upper and lower openings, and means to shield said pan from convection currents including a bowl adjacent to and beneath said pan.

9. Apparatus for determining the moisture content of a material, comprising a torsion wire stretched between and made fast to a rotatable hub and a rotatable scale, rigid means separating said hub and said scale, a fixed datum for the scale, a lever secured to an intermediate portion of the wire, a scale pan borne by the lever, a pointer secured to the lever and having a portion adjacent the datum, said movable scale having a pair of spaced graduations thereon adapted to be brought into selective registration with said datum by rotating said rotatable scale, one of said graduations being registrable with said datum simultaneously with said pointer whereby the apparatus may be brought into a state of balance preparatory to determining the moisture content of a material, the other of said graduations being registrable with said datum upon rotation of said rotatable scale to move said pointer away from said datum and place the wire under a predetermined torsional stress such that when a material of unknown moisture content is placed in said scale pan in an amount sufficient to cause said pointer to again register with said datum, the weight thereof will be automatically determined and the apparatus indexed, and heating means for removing moisture from material in said scale pan whereby said pointer moves away from said datum as moisture is removed from the material, said rotatable scale having graduations thereon intermediate said first mentioned spaced graduations calibrated in terms of moisture content of the material in said scale pan, whereby when the moisture is removed from said material thereby causing said pointer to move away from said datum and said rotatable scale is turned to cause said pointer to again register with said datum, the moisture content of said material may be read directly from said rotatable scale, said apparatus including means for dampening vibration of said lever, a housing for the apparatus having a movable closure member adapted to be moved to open position to permit access to said scale pan, said heating means being carried by said movable closure member whereby it is moved into and out of heat exchange relation to the pan as the closure member is moved between open and closed positions, said housing having a window therein for exposing the datum and portions of the pointer and rotatable scale adjacent thereto, and said rotatable scale having a flange thereon projecting through an opening in the housing to permit manual rotation thereof from the exterior of the housing.

10. In a device of the type described, a specimen pan, a vertically disposed rigid member supporting said pan, and shielding means beneath said pan, said shielding means comprising a bowl like element provided with an opening through which said member passes, said element surrounding the bottom and sides of the pan and having adequate clearances with the pan to permit said pan to tip freely without contacting said element.

11. A device for determining moisture content comprising a casing having a treatment chamber ventilated through upper and lower openings, sample weighing means including a tensioned torsion wire, a lever carried by said torsion wire, said lever having an upstanding single needle bearing adjacent one end, a specimen receiving pan supported on said needle bearing above the center of gravity of said pan and its specimen load, and means to shield the pan from convection currents including a centrally apertured bowl adjacent to and beneath the pan, said needle bearing extending through said aperture in said bowl.

12. In a device of the class described, the combination of a housing, a torsion balance within the housing including a tensioned torsion wire, a lever carried by said wire, a pointer carried by said lever and movable therewith, a stationary datum positioned adjacent the path of movement of said pointer, and means for applying predetermined torsion to said wire other than through said lever, said means including a wheel anchored to the wire and carrying a movable scale also positioned adjacent to said datum, said scale being provided with spaced apart graduations for indicating the application of predetermined minimum and maximum torsion to said wire when said graduations are respectively aligned with said datum, said housing being formed with a window opening adjacent said datum and exposing said datum, the portion of said scale adjacent said datum, and the end of said pointer when aligned with said datum, said scale-carrying wheel projecting through an opening in the housing and rotatable from the exterior of the housing.

13. A device as set forth in claim 12 in which said scale wheel is provided with at least one laterally projecting stop, with stationary means being provided for engagement by said stop for limiting the rotation of the scale wheel in opposite directions.

14. A device as set forth in claim 12 in which said stationary datum is positioned between and adjacent the paths of movement of said pointer and said scale.

15. A device for determining precentage moisture content of a specimen comprising a specimen-supporting surface mounted for substantially vertical movement, spring means normally opposing downward movement of said supporting surface, a relatively fixed datum, means for applying a predetermined force to said surface opposing gravity, which force is exactly counterbalanced by the quantum of specimen placed on said surface, means for heating the specimen while on said supporting surface to thereby drive moisture from the specimen and cause said supporting surface to rise relative to said fixed datum, means for returning said supporting surface to the precise position it occupied prior to said heating, and means for measuring the force required to return the supporting surface to said last mentioned position.

16. A device for determining percentage moisture of a specimen comprising a specimen supporting surface mounted for substantially vertical movement, a relatively fixed datum, spring means normally opposing downward movement of said supporting surface, and maintaining said surface in an initial position with respect to said datum, means for applying a predetermined force to said surface opposing gravity, which force is exactly counterbalanced by the quantum of specimen on said surface whereby the surface is at said initial position, means for heating the specimen placed on said surface whereby said surface rises relative to said datum, and means for measuring the reduction in said predetermined force that is required to return said surface to its initial position.

17. A device for determining percentage moisture of a specimen comprising a tensioned torsion wire, a stationary datum, a lever carried by said wire, a specimen supporting surface carried by said lever and maintained by said wire at an initial position of elevation with respect to said datum, means for applying predetermined torsion to said wire, which torsion is exactly counterbalanced by the quantum of specimen placed on the supporting surface whereby the latter is in said initial position, heater means for removing moisture from the specimen, whereby said surface rises from said position, and means for measuring the reduction in said predetermined torsion required to return said surface to said initial position.

References Cited in the file of this patent
UNITED STATES PATENTS

| | | |
|---|---|---|
| 2,124,968 | Ahrndt | July 26, 1938 |
| 2,417,392 | Craig | Mar. 11, 1947 |
| 2,622,438 | Campbell | Dec. 23, 1952 |
| 2,626,796 | Seederer | Jan. 27, 1953 |

FOREIGN PATENTS

| | | |
|---|---|---|
| 604,863 | Great Britain | Dec. 5, 1946 |